United States Patent [19]

Lopez-Crevillen

[11] Patent Number: 4,667,628
[45] Date of Patent: May 26, 1987

[54] OIL PAN ISOLATION MOUNTING AND SEAL

[75] Inventor: Jose M. Lopez-Crevillen, Westland, Mich.

[73] Assignee: General Motors Corporation, Detroit, Mich.

[21] Appl. No.: 836,552

[22] Filed: Mar. 6, 1986

[51] Int. Cl.$^4$ ............................................. F02F 7/00
[52] U.S. Cl. ........................... 123/195 C; 123/196 R; 123/198 E; 184/106
[58] Field of Search ........... 123/195 C, 198 E, 196 R, 123/195 R; 184/106

[56] References Cited

U.S. PATENT DOCUMENTS

| | | | |
|---|---|---|---|
| 3,540,425 | 11/1970 | Scheiterlein et al. | 123/195 C |
| 4,027,644 | 6/1977 | Timour | 123/198 E |
| 4,202,311 | 5/1980 | Moriyoshi | 123/195 C |
| 4,219,002 | 8/1980 | Danckert et al. | 123/198 E |
| 4,394,853 | 7/1983 | Lopez-Crevillen et al. | 123/195 C |
| 4,423,707 | 1/1984 | Sihon et al. | 123/196 R |
| 4,445,584 | 5/1984 | Kimura et al. | 180/69.22 |
| 4,492,189 | 1/1985 | Ogawa et al. | 123/195 C |

Primary Examiner—E. Rollins Cross
Attorney, Agent, or Firm—Robert J. Outland

[57] ABSTRACT

Arrangements for sound deadening vibration isolation mounting of an engine oil pan on an associated frame or block are provided wherein special flange opening gripping or guiding resilient seals combine with flange recesses, rubber-metal isolators and shoulder bolts or the like to aid installation of the pan and mounting means on an engine.

6 Claims, 9 Drawing Figures

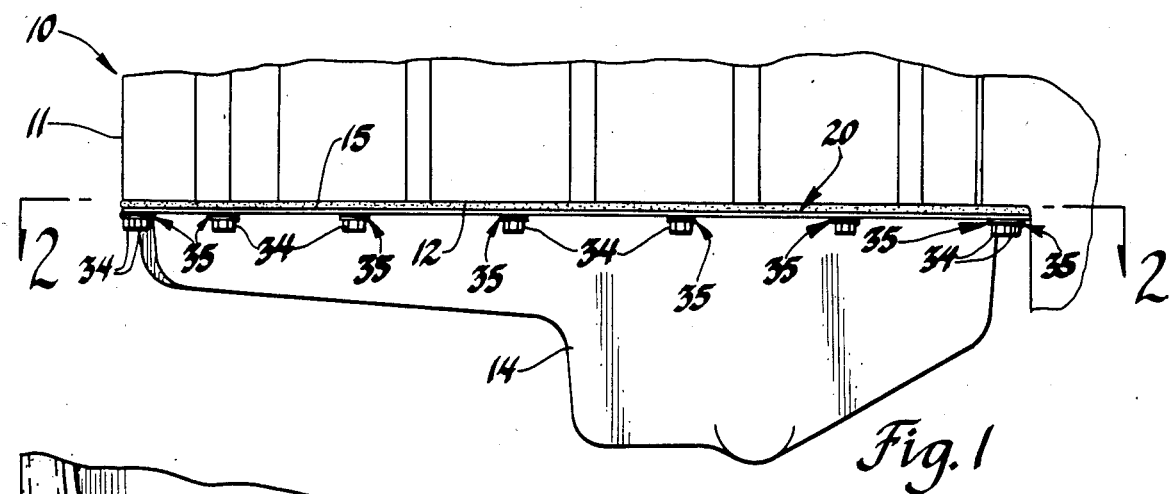
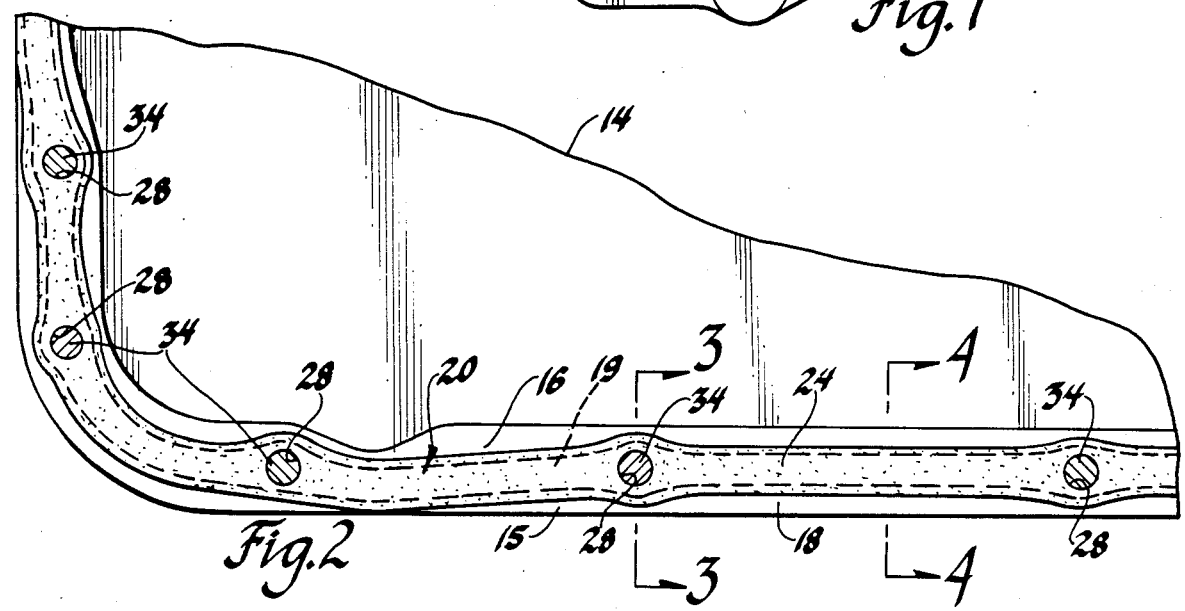
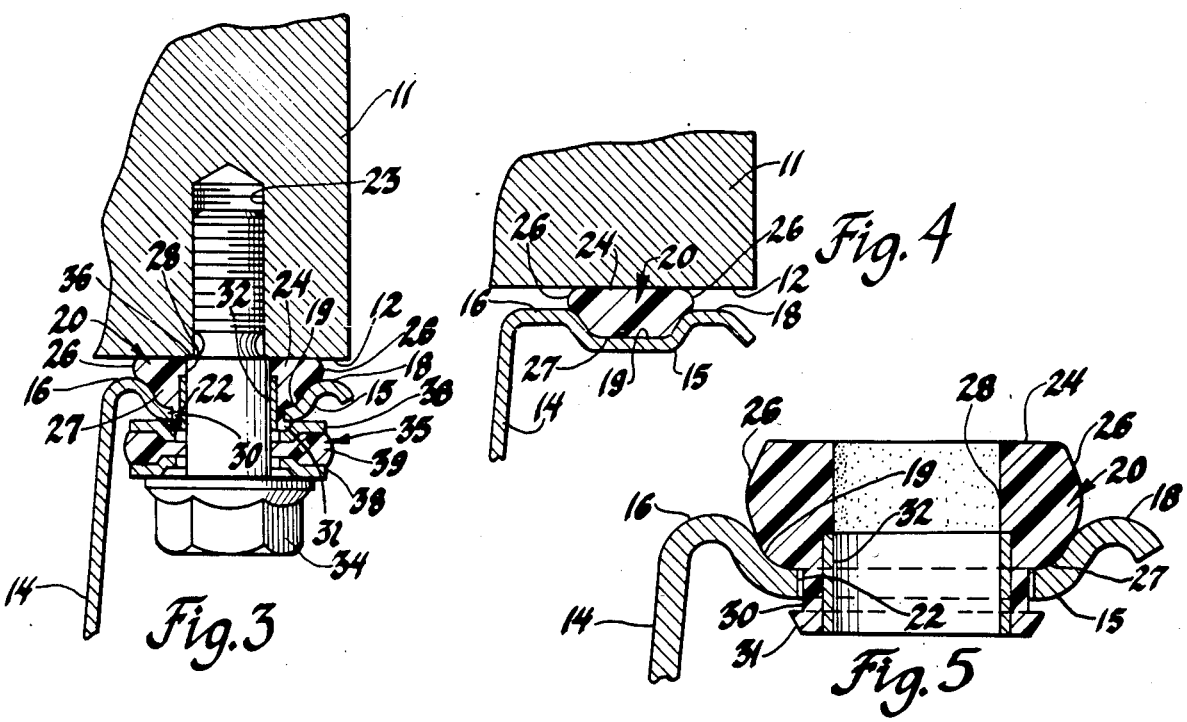

OIL PAN ISOLATION MOUNTING AND SEAL

FIELD

This invention relates to engine oil pans and mountings therefore and, more particularly, to sound deadening vibration isolating seals and oil pan mounting arrangements for engines

BACKGROUND

Various arrangements and means for mounting oil pans and other components in sound deadening vibration isolation from the main frame or block of an internal combustion engine are becoming well known in the art. Such arrangements are disclosed, for example, in my prior U.S. Pat. No. 4,394,853 issued July 26, 1983 and in U.S. Pat. No. 4,423,707 of Sihon and Ransom issued Jan. 3, 1984, both assigned to the assignee of the present invention.

INVENTION SUMMARY

The present invention provides additional mounting arrangements and means for vibration isolation mounting of an engine oil pan to the frame or block. Each arrangement includes the provision of a pan flange and associated seal having aligned fastener openings guiding on sleeve-like cylindrical projection portions of the seal. Grommet-like retainers on the projections or cooperation of the projections with seal engaged bolt bodies act to retain the seal against the oil pan flange during installation of the pan on an engine frame or block.

These and other features and advantages of the invention will be more fully understood from the following description of selected embodiments taken together with the accompanying drawings.

DRAWINGS

In the drawings:

FIG. 1 is a side view of the lower portion of an engine assembly showing a frame carried oil pan with a vibration isolation mounting in accordance with the invention;

FIG. 2 is a fragmentary cross-sectional view of the oil pan and seal assembly looking downward from the plane indicated by the line 2—2 of FIG. 1;

FIG. 3 is a transverse cross-sectional view through one of the fastener openings in the plane of the line 3—3 of FIG. 2;

FIG. 4 is a transverse cross-sectional view between fastener openings from the plane of the line 4—4 of FIG. 2;

FIG. 5 is a transverse cross-sectional view of the pan and seal assembly of FIG. 3 prior to its attachment to the engine frame;

DESCRIPTION

Figure 6:
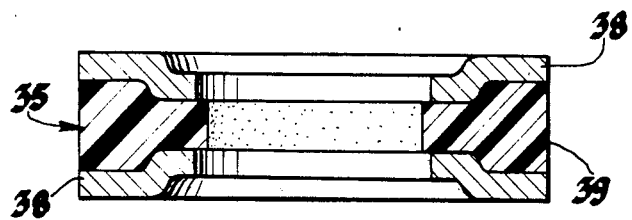
FIG. 6 is a diametral cross-sectional view of a dished isolator washer of the type shown in the assembly of FIG. 3.

Referring first to FIGS. 1-6 of the drawings in detail, numeral 10 generally indicates an internal combustion engine having a frame 11 including a generally flat oil pan-supporting lower surface 12 to which an oil pan 14 is attached by isolation mounting means in accordance with the invention. The oil pan, as shown, is made of formed sheet steel although other materials and methods of forming could be used if desired.

The pan 14 is formed as an open topped downwardly closed container terminating upwardly in an outwardly extending peripheral flange 15. The flange has generally coplanar inner and outer upper edges 16, 18, respectively, lying along opposite sides of a recessed seal receiving portion 19 that extends the length of the flange. The recessed portion 19 receives a peripheral seal 20 and also stiffens the flange against bending by providing a dished or U-shaped cross section. A plurality of fastener receiving openings 22 pierce the flange in the recessed portion at spaced intervals around the periphery. In assembly, the openings 22 align with corresponding threaded bores 23 in the frame 11, opening through the lower surface 12.

The seal 20 is a continuous resilient vibration absorbing member, preferably molded of silicone rubber, or made in any suitable manner of any acceptable material. As seen in cross section compressed in FIGS. 3 and 4 and uncompressed in FIG. 5, the seal 20 has a flattened top 24 connected by sloping sides 26 with a flattened V-like lower portion 27 formed to fit within the flange recess 19. Fastener openings 28 extend through the seal at locations aligned in assembly with the pan and block openings.

At each of the seal openings 28, sleeve-like tubular extensions 30 create cylindrical portions extending downwardly from the seal lower portion 27 protruding, in assembly, through the pan flange openings 22. Enlarged lower edges preferably form sharp edged grommet-like retainers 31 slightly larger in diameter than the pan openings 22 and deformable to pass therethrough. In this manner the seal may be retained on the pan prior to and during assembly of the pan to the engine frame. Preferably, the seal is additionally provided with tubular inserts 32 molded into the cylindrical extensions 30 to stiffen the extensions for forcing them into the pan openings 22.

In assembly, the oil pan 14 is secured to the engine frame lower surface 12 by shoulder bolts 34, or equivalent bolt-sleeve assemblies, which pass through and engage rubber-metal isolator washers 35, holding them in engagement with the lower side of the pan flange 15. The bolts 34 also extend through the pan and seal openings 22, 28 and into engagement with the threaded bores 23 of the frame. The enlarged shoulders 36 of the bolts 34 engage the frame surface 12 to limit compression of the seal 20 and isolator washers 35 so as to provide the optimum vibration isolation of the pan from the frame.

The isolator washers 35, as shown in FIG. 6, are formed from dished metal washers 38 molded with a rubber washer 39 between them. The openings through the rubber washers 39 and the molded seal 20 are all smaller than the corresponding openings in the metal washers 38 and the pan flange 15. This is true at least when the rubber portions are compressed in assembly and is, preferably, also the case prior to assembly as seen in FIGS. 5 and 6. Thus, the contacting metal portions of the frame 11, bolts 34 and lower washers 38 are positively isolated by rubber from the pan flange 15 and the upper washers 38 which the flange contacts.

To assemble the oil pan 14 to the frame 11 of the FIG. 1-6 embodiment, the seal 20 is first located in position on the pan flange 15 and the tubular protrusions 30 are forced into the pan openings 22, using an insertion tool if necessary. Upon insertion, the retainers 31 expand to hold the seal in place on the flange as shown in FIG. 5. The pan and seal assembly is then positioned against the frame surface 12 and the bolts 34 and washers 35 are installed and tightened. The recesses formed at the inner diameters of the dished washers 38 provide clearance for the seal retainers 31 which extend below the pan flange 15.

Figure 7:
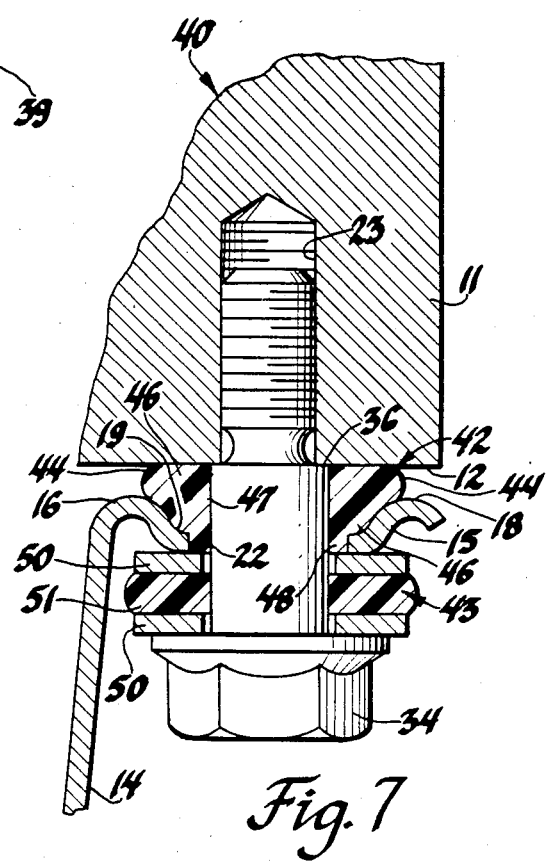
FIG. 7 is a cross-sectional view similar to FIG. 3 but showing an alternative embodiment of isolation mounting in accordance with the invention.
Figure 8:
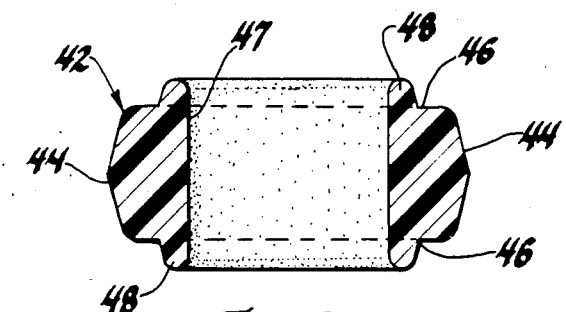
FIG. 8 is a transverse cross-sectional view of a reversible seal configured for use in the arrangement of FIG. 7.
Figure 9:
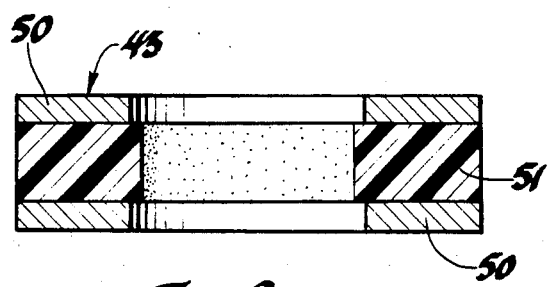
FIG. 9 is a diametral cross-sectional view of a flat isolating washer construction for use in the arrangement of FIG. 7.

Referring now to FIGS. 7-9, there is shown an alternative embodiment of isolation mounting applied to an engine generally indicated by numeral 40. Like reference numerals are used for the illustrated portions of the engine frame 11, oil pan 14 and shoulder bolts 34, since they are unchanged from the first described embodiment. The altered components are the resilient vibration absorbing seal 42, shown separately in FIG. 8, and the isolator washers 43, shown separately in FIG. 9.

In the resilient seal 42, angled sides 44 connect identical flattened upper and lower portions 46 having spaced fastener openings 47 extending therethrough. Tubular protrusions or sleeve-like cylindrical extensions 48 are provided on both the upper and lower portions 46 at each opening 47. The extensions are long enough to protrude into, but not through or very far through the pan flange openings 22.

The seal 42 may be installed with either portion 46 against the pan flange, since the fastener receiving hole patterns are symmetrical. The extensions 48 on the lower portion locate the seal in the pan openings. The shoulder bolts 34 and washers 43 are then installed. Since the seal openings 47 are made smaller than the shoulders 36 of the bolts 34, the bolts are gripped by the seal, holding all the components in assembly while the pan is aligned with the frame 11 and the bolts 34 are threaded into the bores 23.

The isolator washers 43 are made with flat metal washers 50, since there is no need to provide clearance for the seal retainers not present in this embodiment. However, the dished washers 35 of the prior embodiment could be substituted for the washers 43 if desired.

In assembly, as shown in FIG. 7, the bolts compress the seal 42 an amount controlled by the shoulder bolts but sufficient to flatten the extensions 48 on the upper, frame, side of the seal 42 while the extensions 48 on the lower, flange engaged, side protrude into the flange openings 22. The rubber washers 51 of the isolators 43 are again made with smaller inner diameters than the metal washers 50 to keep the bolts from grounding against the metal washers 50, thus completely isolating the pan and frame by rubber members.

While the invention has been described by reference to certain embodiments chosen for purposes of illustration, it should be understood that numerous changes could be made without departing from the spirit and scope of the inventive concepts disclosed. Accordingly, it is intended that the invention not be limited to the disclosed embodiments, but that it be given the full scope permitted by the language of the following claims.

The embodiments of the invention in which an exclusive property or privilege is claimed are defined as follows:

1. In an engine having a crankcase with a peripheral wall having a lower edge including a mounting surface and openings through said surface,
   a downwardly closed oil pan having a peripheral flange extending outward from open upper edges of the pan and mounted in opposed sealing relation to said crankcase wall mounting surface, said flange including openings aligned with the crankcase openings,
   a resilient vibration absorbing seal compressed between the pan flange and the mounting surface, said seal having openings aligned with the flange and crankcase openings,
   isolator means below and engaging the flange and having openings therethrough aligned with each of the flange openings, said isolator means including a resilient supporting element, and
   fasteners extending through said aligned openings and engaging the crankcase wall openings and the isolator means to support the oil pan, said fasteners including an enlarged body portion seated against the crankcase wall adjacent the crankcase openings to limit the compression of said seal and isolator means,
   said seal including cylindrical portions extending into the flange openings around the fastener body portions to prevent contact between the flange and the fastener means and thereby isolate the oil pan from vibration transmitting engagement with the crankcase and the attached fastener means.

2. In an engine having a crankcase with a peripheral wall having a lower edge including a mounting surface and openings through said surface,
   a downwardly closed oil pan having a peripheral flange extending outward from open upper edges of the pan and mounted in opposed sealing relation to said crankcase wall mounting surface, said flange including openings aligned with the crankcase openings,
   a resilient vibration absorbing seal compressed between the pan flange and the mounting surface, said seal having openings aligned with the flange and crankcase openings,
   isolator means below and engaging the flange and having openings therethrough aligned with each of the flange openings, said isolator means including a resilient supporting element, and
   fasteners extending through said aligned openings and engaging the crankcase wall openings and the isolator means to support the oil pan, said fasteners including an enlarged body portion seated against the crankcase wall adjacent the crankcase openings to limit the compression of said seal and isolator means,
   said seal including cylindrical portions extending into the flange openings around the fastener body portions to prevent contact between the flange and the fastener means and thereby isolate the oil pan from vibration transmitting engagement with the crankcase and the attached fastener means, said cylindrical portions having enlarged lower edges extending below the flange to form grommet-like retainers to secure the seal to the flange prior to assembly of the oil pan to the crankcase.

3. A combination as in claim 2 wherein the seal openings are sized to grip the fastener body portions and thereby retain the fastener means in assembled position on the oil pan prior to assembly to the crankcase.

4. A combination as in claim 3 wherein the isolator means comprise sandwich washers having a pair of metal washer elements separated by said resilient supporting elements, the openings through said supporting elements being smaller in diameter than aligned openings in the metal washer elements to prevent contact between the metal elements and the fastener means.

5. A resilient vibration absorbing seal for isolating and sealing a crankcase and oil pan joint, said seal comprising a continuous band of vibration absorbing resilient material having generally flattened upper and lower surfaces, a plurality of longitudinally spaced fastener openings extending through the seal upper and lower surfaces, and cylindrical portions extending below said flattened lower surfaces around the fastener openings to prevent contact between the flange of associated oil pan and fastener means and thereby isolate the oil pan from vibration transmitting engagement with an associated crankcase and said fastener means.

6. A seal as in claim 5 wherein said cylindrical portions have enlarged lower edges extending to form grommet-like retainers to secure the seal to the flange prior to assembly of the oil pan to the crankcase.

* * * * *